US010614402B2

(12) United States Patent
Appel et al.

(10) Patent No.: US 10,614,402 B2
(45) Date of Patent: Apr. 7, 2020

(54) HUMAN STEERING DASHBOARD TO ANALYZE 360-DEGREE MARKET VIEW FOR MERCHANTS BASED ON FINANCIAL TRANSACTIONS

(71) Applicant: INTERNATIONAL BUSINESS MACHINES CORPORATION, Armonk, NY (US)

(72) Inventors: Ana Paula Appel, Sao Paulo (BR); Ricardo Vieira Borges Franco, Sao Paulo (BR); Marisa Affonso Vasconcelos, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/705,635

(22) Filed: Sep. 15, 2017

(65) Prior Publication Data
US 2019/0087760 A1 Mar. 21, 2019

(51) Int. Cl.
| G06Q 10/06 | (2012.01) |
| G06Q 10/08 | (2012.01) |
| G06Q 50/00 | (2012.01) |
| G06Q 40/02 | (2012.01) |

(52) U.S. Cl.
CPC ......... *G06Q 10/0637* (2013.01); *G06Q 10/08* (2013.01); *G06Q 40/025* (2013.01); *G06Q 50/01* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 6,430,542 | B1 |  | 8/2002 | Moran |  |
| 6,629,081 | B1 | * | 9/2003 | Cornelius | G06Q 20/04 |
|  |  |  |  |  | 705/30 |
| 8,606,695 | B1 |  | 12/2013 | Arora et al. |  |
| 8,694,401 | B2 | * | 4/2014 | Stewart | G06Q 40/02 |
|  |  |  |  |  | 705/35 |
| 8,918,904 | B2 | * | 12/2014 | Sanin | H04L 51/32 |
|  |  |  |  |  | 705/38 |

(Continued)

FOREIGN PATENT DOCUMENTS

EP          1050833          11/2000

OTHER PUBLICATIONS

Leo, et al., "Correlations of Consumption Patterns in Social-Economic Networks"; https://arXIV.org/pdf/1609.03756v1.pdf, Sep. 13, 2016, pp. 1-11.

(Continued)

*Primary Examiner* — Alan S Miller
(74) *Attorney, Agent, or Firm* — F. Chau & Associates, LLC (57) ABSTRACT

A processor-implemented method for providing merchants business advice, the method including: providing a merchant with a dashboard, the dashboard including information related to the merchant's business and a communication link to the merchant's financial institution; receiving a request from the merchant via the dashboard, the request being for a service provided by the merchant's financial institution; processing the request from the merchant by using data about the merchant's business; and providing a response to the request for viewing at the dashboard by the merchant.

18 Claims, 5 Drawing Sheets

(56) References Cited

U.S. PATENT DOCUMENTS

| | | | |
|---|---|---|---|
| 2002/0019761 A1* | 2/2002 | Lidow | G06Q 10/02 705/5 |
| 2002/0194120 A1* | 12/2002 | Russell | G06Q 10/10 705/38 |
| 2007/0156584 A1* | 7/2007 | Barnes | G06Q 20/102 705/40 |
| 2008/0059364 A1* | 3/2008 | Tidwell | G06Q 20/403 705/38 |
| 2010/0057742 A1* | 3/2010 | Hardy-McGee | G06Q 10/0637 705/30 |
| 2010/0100424 A1 | 4/2010 | Buchanan et al. | |
| 2010/0100469 A1* | 4/2010 | Buchanan | G06Q 10/06 705/35 |
| 2010/0100470 A1 | 4/2010 | Buchanan et al. | |
| 2011/0087985 A1 | 4/2011 | Buchanan et al. | |
| 2011/0161137 A1 | 6/2011 | Ubalde et al. | |
| 2011/0246346 A1* | 10/2011 | Satyavolu | G06Q 30/02 705/35 |
| 2012/0004964 A1* | 1/2012 | Satyavolu | G06Q 20/387 705/14.17 |
| 2012/0191594 A1* | 7/2012 | Welch | G06Q 40/02 705/38 |
| 2013/0339217 A1* | 12/2013 | Breslow | G06Q 40/025 705/38 |
| 2013/0346221 A1* | 12/2013 | Rangachari | G06Q 30/0207 705/14.73 |
| 2014/0172560 A1* | 6/2014 | Satyavolu | H04M 15/805 705/14.53 |
| 2015/0046363 A1* | 2/2015 | McNamara | G06Q 10/0635 705/333 |
| 2015/0073977 A1 | 3/2015 | Ghosh et al. | |
| 2015/0112854 A1* | 4/2015 | Guriel | G06Q 40/025 705/38 |
| 2015/0178651 A1* | 6/2015 | Eickelmann | G06Q 10/06315 705/7.25 |
| 2016/0086222 A1* | 3/2016 | Kurapati | G06Q 30/0204 705/14.53 |
| 2016/0140466 A1* | 5/2016 | Sidebottom | G06Q 10/0635 705/7.28 |
| 2017/0192648 A1* | 7/2017 | Abedin | G06Q 10/06393 |
| 2018/0197129 A1* | 7/2018 | Appel | G06Q 10/06315 |
| 2019/0294633 A1* | 9/2019 | Dembo | G06N 5/027 |

OTHER PUBLICATIONS

Efma and Kurt Salmon; Payment Innovation: Maximizing the Potential of Payment Analytics, Sep. 2014, pp. 1-44.

S.M. Wagner et al., "Assessing the Vulnerability of Supply Chains Using Graph Theory", Int. J. Production Economics, 2010, 126, pp. 121-129.

L. Zhang et al., "A Credit Risk Assessment Model Based on SVM for Small and Medium Enterprises in Supply Chain Finance", Financial Innovation, 2015, 1:14.

U.S. Office Action issued in corresponding U.S. Appl. No. 15/401,222 dated Aug. 16, 2019.

* cited by examiner

HUMAN STEERING DASHBOARD TO ANALYZE 360-DEGREE MARKET VIEW FOR MERCHANTS BASED ON FINANCIAL TRANSACTIONS

CROSS-REFERENCE TO RELATED APPLICATION

This application is related to U.S. application Ser. No. 15/401,222, filed Jan. 9, 2017 entitled 'Predict Possible Vulnerabilities/Revenue Losses in B2B using Bank Transactions') in the U.S. Patent and Trademark Office, the disclosure of which is incorporated by reference herein in its entirety.

BACKGROUND

The present invention relates to finance dashboards, and more specifically, to a financial data dashboard for use by financial institutions and small merchants.

SUMMARY

According to an exemplary embodiment of the present invention, there is provided a processor-implemented method for providing merchants business advice, the method including: providing a merchant with a dashboard, the dashboard including information related to the merchant's business and a communication link to the merchant's financial institution; receiving a request from the merchant via the dashboard, the request being for a service provided by the merchant's financial institution; processing the request from the merchant by using data about the merchant's business; and providing a response to the request for viewing at the dashboard by the merchant.

According to an exemplary embodiment of the present invention, there is provided a processor-implemented method for providing merchants business advice, the method including: providing a financial institution with a dashboard, the dashboard including information related to a plurality of businesses and a communication link to each of the businesses; analyzing transactions among participants in a supply chain of a first business of the plurality of businesses and combining the transactions with pre-existing data about the first business to compute a business-related recommendation for the first business; and providing the business-related recommendation to the first business via the communication link between the first business and the financial institution.

According to an exemplary embodiment of the present invention, there is provided a processor-implemented method for providing merchants business advice, the method including: creating a graphical representation of a supply chain, the graphical representation including a plurality of nodes and a plurality of edges between the nodes, each node including an entity in the supply chain, each entity including a profile and each edge including an interaction between two entities; displaying the graphical representation of the supply chain in a graphical user interface; using the profile at each entity in the supply chain and each interaction between two entities to determine a business-related recommendation for a merchant; and providing the business-related recommendation to the merchant via a communication link with the merchant.

DETAILED DESCRIPTION

In accordance with an exemplary embodiment of the present invention, there is provided a system and method to provide merchants business advice.

In general, small merchants do not have a full view of where their clients are going, who their nearby competitors are and how they are doing. The present invention combines several sources of information such as bank financial transactions, customer geolocated data (e.g., check-ins), social network/media, as well as similar business competitor's data to provide a full 360-degree view of a small merchant's business. Thus, the system can provide a detailed view of a merchant's financial transactions and information about the merchant's providers to support the merchant with financial advice about his business.

In an exemplary embodiment of the present invention, there is provided a dashboard that will allow small merchants to have a full view of their business and a communication channel to interact with their financial institutions. Using data about the merchants, among others, the dashboard can be used by financial institutions to recommend services and perform predictions about their business.

In addition, financial institutions can offer financial advice to a small merchant by using information about the small merchant's supply chain, and provide this advice to the merchant via the communication channel.

For example, if a merchant depends on suppliers of a particular wheat, and there is an indication (say, via a weather forecast) that this product will have its price increased, the merchant can receive a notification suggesting him to stock more wheat to avoid a significant increase in his expenses. Further, if a small merchant needs a loan, the financial institution can offer credit given the merchant's supply chain situation. The dashboard can also be used to visualize information about the competitors of a given merchant, providing comparisons with other small business in the same geographic region and recommending possible measures to improve their attractiveness in the market region.

Figure 1:
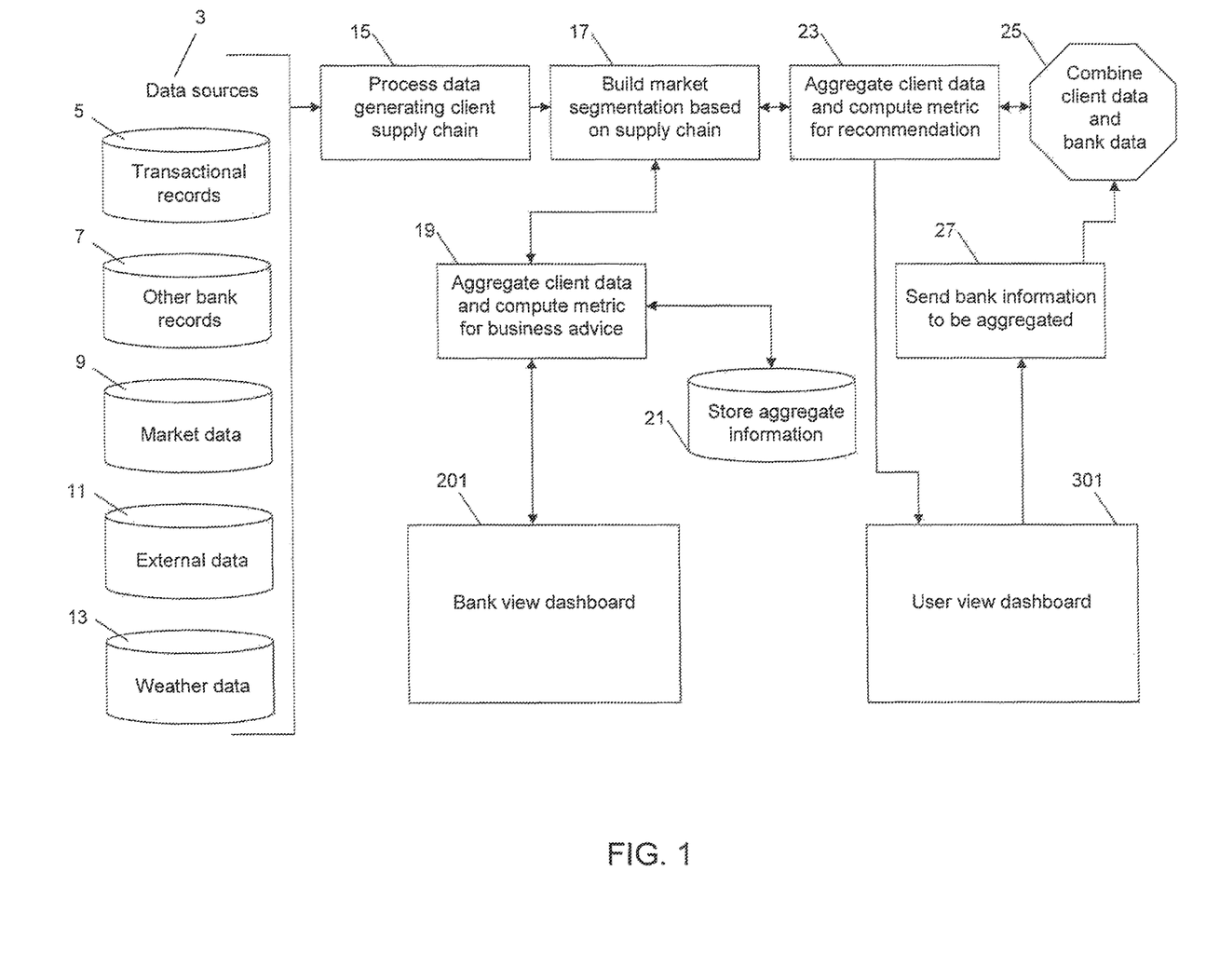
FIG. 1 illustrates a system and method according to an exemplary embodiment of the present invention.

In a system and method according to an exemplary embodiment of the present invention, there includes a database preparation process 3. In database preparation, a plurality of data is gathered from a plurality of data sources. Examples of these data sources are shown in FIG. 1. It is to be understood that FIG. 1 is illustrative of a system and method according to an exemplary embodiment of the present invention. As shown in FIG. 1, the data sources include, inter alia, transactional sources 5, other bank records 7, market data 9, external data (e.g., news, social media, etc.) 11, and weather (e.g., climate) data 13.

In addition to social media data, there may be included network data. The network data may be geolocated data in a particular location or geolocated data nearby a particular location. The merchant's financial flow, e.g., bank transactions, may also be included, as well as customer profile information. Customer profile information may include things such as time, day, region where the customer lives, products typically purchased, etc. Supply chain information may be included as a data source, as well as agriculture information.

In the system and method according to an exemplary embodiment of the present invention, the data is processed to generate a supply chain 15. The supply chain can then be displayed on the financial institution's dashboard. An example of the financial institution's dashboard 201 is shown in FIG. 2.

Figure 2:
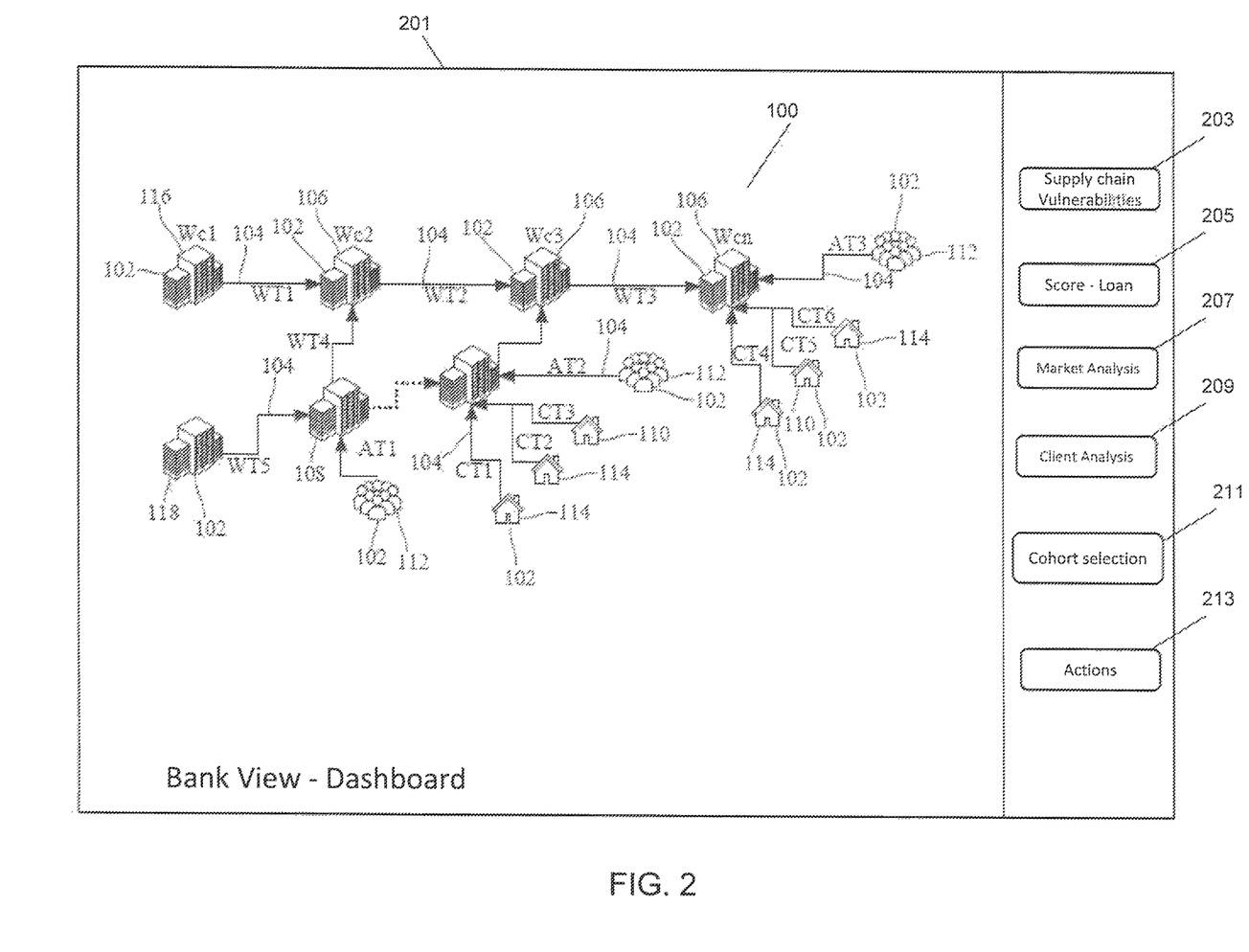
FIG. 2 illustrates a bank view dashboard according to an exemplary embodiment of the present invention.

Referring to FIG. 2, an exemplary embodiment of a graphical representation 100 of the supply chain is illustrated. The graphical representation includes a plurality of nodes 102, which can have some associated nodes weight (WcN) that expresses an analysis of an entity, stock price, news about the entity or price in the market, and a plurality of edges 104, which can have weights that can be amount of money flow between two nodes, frequency—monthly or not, etc. (At=WT=Ct), between pairs of nodes in the graph. Each node represents an entity in the supply chain. Suitable entities include, but are not limited to, a business 106, a financial institution 108, an insurance provider 110, an aggregate of customers 112, a vendor 114, i.e., a supplier of materials and services to one or more businesses, a licensing agency 116 or a regulatory agency 118. In one embodiment, the customers may be used only to show that businesses receive revenue from customers; therefore, customers are represented in aggregate. Each entity in the graphical representation has associated profile, which is stored in a database and can be viewed by selecting the entity in a graphical environment. The profile contains properties of the entity that can be used in determining vulnerabilities in the supply chain. In one embodiment, each profile includes at least one of geographical location, number of employees, demographic data, revenue, credit score, popularity, capitalization, current liabilities, licenses, real property, personal property, history of business transactions, corporate structure and industrial sector.

Each edge represents a given interaction, relationship or business transaction between two entities. Suitable interactions between entities include, but are not limited to, an exchange of goods or services, a loan, a contract, a payment, a supply of materials, an extension of credit, a regulatory control, a license, a legal proceeding and combinations thereof. With all of the entities and interactions displayed in the graphical representation, the profile at each entity in the supply chain and each interaction between two entities to determine a current level of vulnerability to perturbations in the supply chain for at least one of the entities in the supply chain. Therefore, all of the entities in the supply chain and all interactions between the entities may be considered in determining, locating or predicting current and future vulnerabilities. Suitable current levels of vulnerability to perturbations in the supply chain include, but are not limited to, current cash flow, current creditworthiness, current capital reserves, current market share, current availability of raw materials, current backlog, current ability to meet demand, insufficient insurance, current regulatory constraint or combinations thereof. These current levels of vulnerability derived from the entire supply chain are then used to determine remedial actions that can be taken to avoid negative consequences or to improve the current level of vulnerabilities. Suitable remedial actions include, but are not limited to, extending credit, making a loan, identifying alternative sources of raw materials, providing access to working capital, identifying investors, increasing insurance, granting a regulatory waiver and combinations thereof.

In the system and method according to an exemplary embodiment of the present invention, a market segmentation is built based on the supply chain 17. Here, the market could be geographically segmented by region, it could be segmented by industry or a particular nature of business, or it could be segmented by the average size of a business, all related to specific kinds of supply chains.

In the system and method according to an exemplary embodiment of the present invention, client data can be aggregated and metrics can be computed to provide business advice 19. Here, for example, data could be aggregated by analyzing transactions among participants of the supply chain (e.g., payed from, sold to) together with frequency and amount. The data could be combined with transactions between participants and the bank (e.g., loans, credit, etc.) and consolidated to generate metrics or similar pattern behaviors.

In the system and method according to an exemplary embodiment of the present invention, the aggregate information may be stored 21. In this case, a hardware memory containing one or more databases may be used. The hardware memory may be part of a computing system. The computing system may include at least one computer processor that is in communication with the database or a memory and that can execute the software and perform all of the computational functions for operation of the computing system for detecting vulnerabilities in a supply chain as well as for providing merchants with business advice. In one embodiment, the computing system includes a plurality of processors. All of the components, modules and systems of the computing system, including the database and the processor may be in communication through one or more local or wide area networks.

In one embodiment, the database stores the plurality of entities in the supply chain, the profile for each entity and the plurality of interactions between pairs of entities. Therefore, the database includes all of the information and data necessary to create the graphical representation of the supply chain, to identify vulnerabilities within the supply chain and to provide merchants with business advice. In order to obtain the information stored in the database, the computing system includes an input module in communication with the database. The input module is also in communication through the networks with all of the sources of information on the plurality of entities in the supply chain, the profile for each entity and the plurality of interactions between pairs of entities. Suitable entities include, but are not limited to, a business, a financial institution, an insurance provider, an aggregate of customers, a vendor, a licensing agency or a regulatory agency. Suitable profile information includes, but is not limited to, geographical location, number of employees, demographic data, revenue, credit score, popularity, capitalization, current liabilities, licenses, real property, personal property, history of business transactions, corporate structure and industrial sector. The interactions between entities represent, for example, an exchange of goods or services, a loan, a contract, a payment, a supply of materials, an extension of credit, a regulatory control, a license, a legal proceeding and combinations thereof.

The input module obtains the desired entity, profile and interaction information from a plurality of sources including, credit reporting agencies, bank records, social media, websites, annual reports and new reports. In one embodiment, the input module also obtains external data, i.e., data external to and not directly influenced by the supply chain. These external data, however, can have an influence on the vulnerabilities of the entities in the supply chain. Suitable external data include, but are not limited to meteorological data, economic data, geopolitical data, commodity market data, business market data and demographic trends data.

The computing system may further include a graph builder in communication with the database. The graph builder uses the stored information on the entities, profiles and interactions to create a graphical representation of the supply chain as illustrated, for example, in FIG. 2. In general, the graphical representation contains a plurality of nodes and a plurality of edges between nodes. Each node represents one of the plurality of entities, and each edge is of the plurality of interactions.

The computing system may further include a prediction module in communication with the database and the graph builder to determine a current level of vulnerability to perturbations in the supply chain for at least one of the entities in the supply chain. This determination of the current level of vulnerability is made using the set of descriptive properties at each entity in the supply chain and each interaction between two entities. In one embodiment, the prediction module also uses the external data in combination with the profile at each entity in the supply chain and each transaction between two entities to determine the current level of vulnerability to perturbations in the supply chain for one or more of the entities in the supply chain. The current level of vulnerability to perturbations in the supply chain include, but are not limited to, a current cash flow, current creditworthiness, current capital reserves, current market share, current availability of raw materials, current backlog, current ability to meet demand, insufficient insurance, current regulatory constraint and combinations thereof.

The computing system may further include a recommendation module in communication with the prediction module to identify remedial actions to be taken in the supply chain to reduce the current level of vulnerability for at least one entity in the supply chain. Suitable remedial actions include, but are not limited to, extending credit, making a loan, identifying alternative sources of raw materials, providing access to working capital, identifying investors, increasing insurance, granting a regulatory waiver and combinations thereof. A remediation module is provided in the computing system in communication with the to enact the remedial actions in the supply chain. Having taken the desired remedial actions, a profile updater in the computing system in communication with the database and the input module is used to update the profile for at least one entity based on the remedial actions enacted in the supply chain.

The computing system may further include an output module that is in communication with the graph builder to display and to output the graphical representation of the supply chain in a graphical user interface. Manipulation and customization of the graphical user interface of the graphical representation of the supply chain is facilitated by a filter provided in the computing system. The filter is used to filter the nodes and edges in the graphical representation of the supply chain in accordance with common elements in the profiles. The filter can also be configured to provide highlighting or other automatic or user-defined indications in the graphical representation.

In the system and method according to an exemplary embodiment of the present invention, client data can be aggregated and metrics can be computed to provide recommendations for clients 23. Here, for example, a historical analysis combined with some cognitive capabilities could recognize similarities and unveil some insights or predictions about the clients. These insights could be turned into recommendations to clients (e.g., cash flow anticipation, loans, extra credit, etc.).

In the system and method according to an exemplary embodiment of the present invention, client data and bank data may be combined 25 after the client sends the bank data information to be aggregated 27.

Referring back to FIG. 2, elements from 203 to 213 are functionalities (not restrict) that a user can use in the tool according to an exemplary embodiment of the present invention. Element 203 computes the entities that have vulnerability in the supply chain that is present. This vulnerability means that the entity will be in debt with clients and financial institutions. Element 205 can compute a score to loan money for a specific entity, using not only a traditional model but also the supply chain connection and other data sources described above. Element 207 looks for similar entities in other supply chains in close regions (not restrict to that). For example, if the entity is a bakery this button will look for similar bakeries in other supply chains to compare how the market in one region is doing better than the other. In addition, this will give insight, for example, of social media and other data sources about this entity, a sentiment analyses, check-ins at the place of business, etc. Element 209 will mix financial institution data with client data and provide a better view about its financial situation. Cohort selection in element 211 will provide a supply chain segmentation to find similar supply chains in different regions. Element 213 will recommend actions for the user (e.g., entity), such as to buy products in advance, improve the marketing communication for some regions, recommend to loan some money or not, etc.

Figure 3:
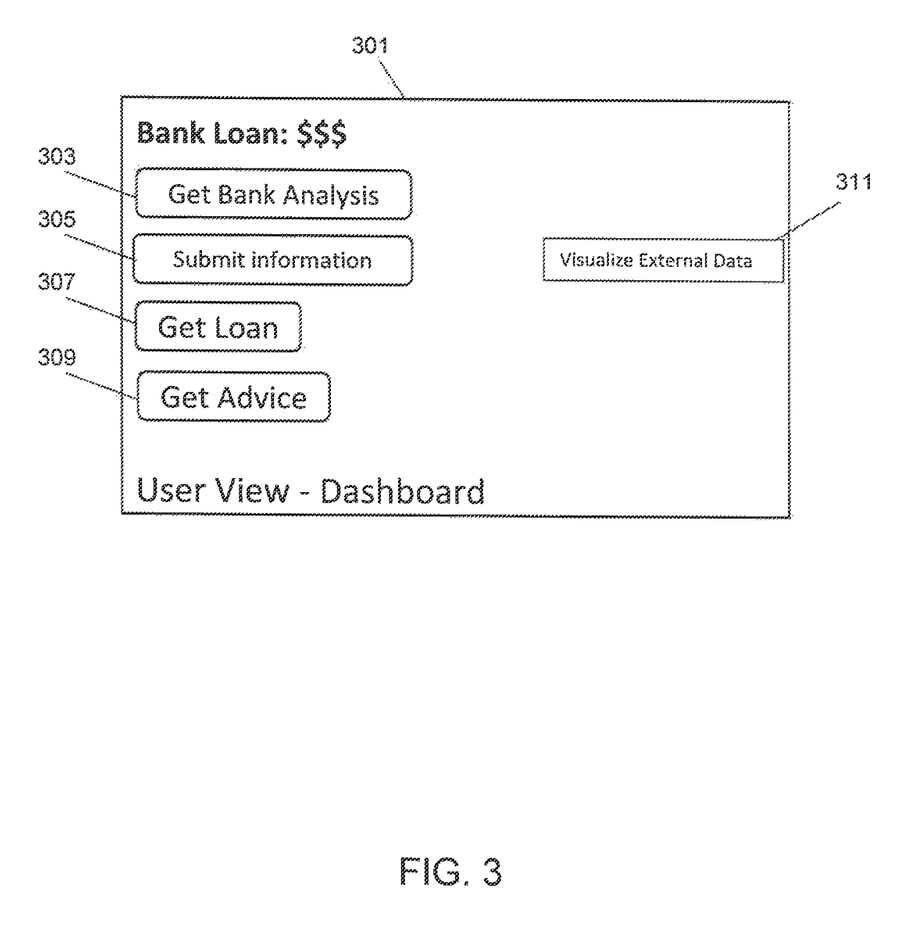
FIG. 3 illustrates a user view dashboard according to an exemplary embodiment of the present invention.

Referring back to FIG. 3, each element is a functionality that a user can take using the inventive tool, for example, to get a loan from the bank (element 303). This button will give the user some recommendations about their finances from the financial institution's point of view. Since the institution has a better view using payment information, it can know if there are vulnerabilities in the chain. Regarding element 305, the client sends some information about its business to improve the trust and credit score in the bank; this information could be a number of employees, an average price of a ticket, providers, etc. Element 307 will put the client in contact with a bank to solicitate some money. In addition, the tool will run some analyses such as market analyses, credit score, supply chain vulnerabilities, etc., to evaluate the credit score of the client. Element 309 will give client advice as how to obtain a loan, buy some product in advance, etc., based on market analyses and supply chain and client information. It is to be understood that as the system acquires more information, the more accurate the advice/recommendation can be. This button can also start a chat bot (e.g., a cognitive agent) that will talk to the client and give advice, and ask questions about the advice. Element 311 provides some visualization about the client as pertains to their use of open data such as twitter, news etc., showing what people are say about its business, as well as some sentiment analyses and so forth.

Hereinafter, there are described a plurality of uses cases for exemplary embodiments of the present invention.

Example use case 1: the present invention can be used to add value to the merchant's relationship with the bank by offering the dashboard in a paid or non-paid model in addition to internet banking transactions and a workflow system already in place for merchants.

Example use case 2A: the bank view (e.g., consolidated institutional dashboard) can be used for the bank to provide business advice on top of financial advice, acting like a type of business planning support service for the merchant.

Example use case 2B: as the bank gains more trust due to the business advice provided to the merchants, the bank may gain more data about the merchant's business, thereby enabling the bank to provide better input for more strategic decisions.

Example use case 3: the bank could also monetize the consolidated financial data of the network (or parts of the network) including some observed market trends to create a new offering of geo-marketing data for merchants, consulting companies or franchising companies interested in knowing the best spot for merchants' new business locations or adjustments in current locations.

Example use case 4: for the foods and beverages segment, not only can banks see value in use of the present invention, but also debit card providers for benefits like beverages and foods in some countries (e.g., Brazil) where the dashboard could present the entire chain of preferences in terms of "Merchants of Choice" for preferred benefits consumptions locations.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, with the possible exception of limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 4:
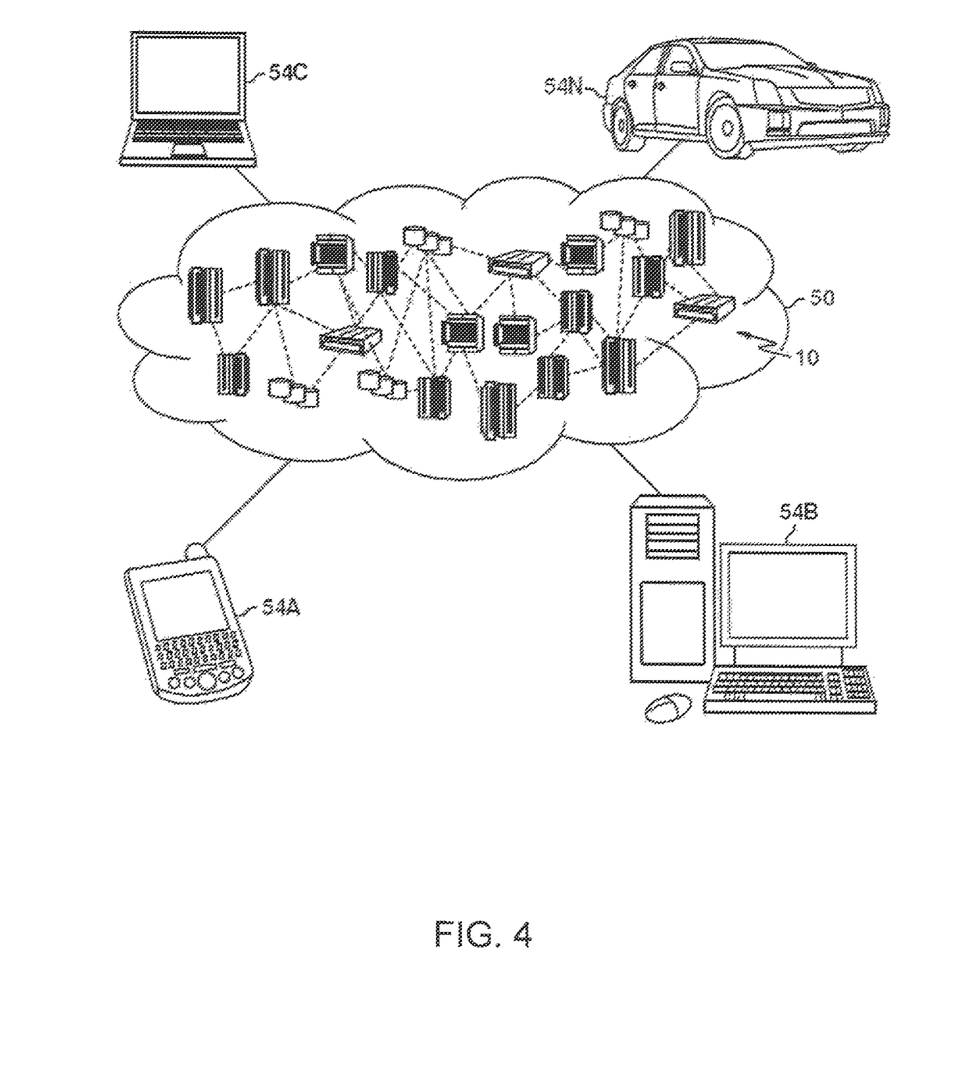
FIG. 4 illustrates a cloud computing environment according to an exemplary embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 4, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection, e.g., using a web browser.

Figure 5:
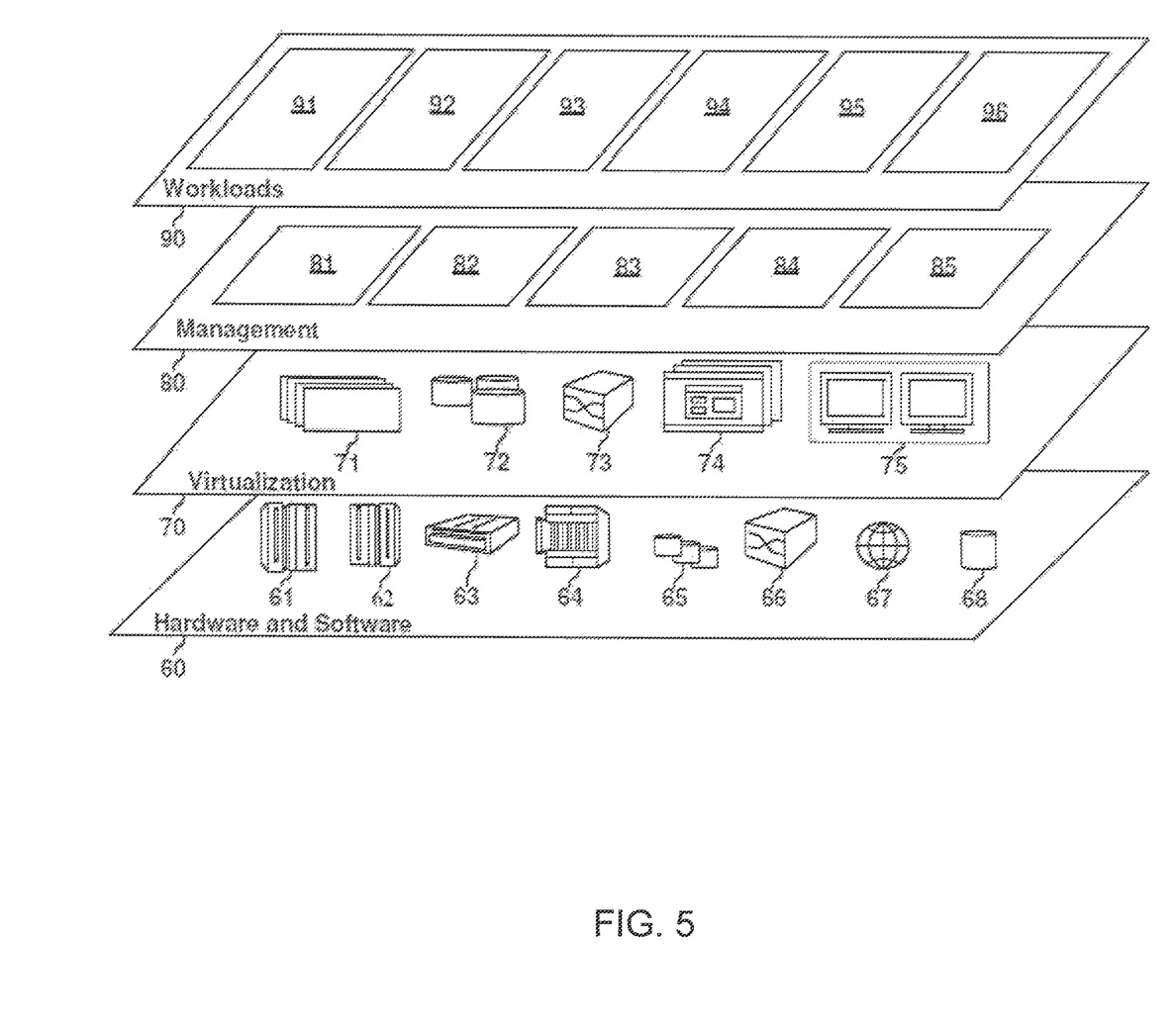
FIG. 5 illustrates abstraction model layers according to an exemplary embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method for providing merchants business advice 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for providing merchants business advice, the method comprising:
    providing a merchant with a first dashboard, the first dashboard including information related to the merchant's business and a communication link to the merchant's financial institution;
    receiving a request from the merchant via the first dashboard, the request being for a service provided by the merchant's financial institution;
    processing the request from the merchant by using data about the merchant's business;
    providing a response to the request for viewing at the first dashboard by the merchant;
    providing a bank with a second dashboard, the second dashboard including the data about the merchant's business;
    generating a supply chain of the merchant using a plurality of data sources and a processor, wherein the supply chain includes a plurality of nodes and edges, each node representing an entity in the supply chain, each edge representing a transaction between two of the entities;
    visualizing the supply chain at the second dashboard; and
    analyzing the transactions in the supply chain and combining the transactions with the data about the merchant's business to compute business metrics,
    wherein at least one of the business metrics includes a current level of vulnerability to perturbations in the supply chain for at least one of the entities, and
    wherein the visualization permits a real-time evaluation of the at least one business metric and enables an alternative to the at least one business metric to be determined when the current level of vulnerability is above a threshold.

2. The processor-implemented method of claim 1, further comprising:
    providing an unsolicited business-related suggestion to the merchant for viewing at the first dashboard.

3. The processor-implemented method of claim 2, wherein the business-related suggestion is generated by using the data about the merchant's business.

4. The processor-implemented method of claim 1, wherein the data about the merchant's business includes social media, news, or blog data related to the merchant's business, the merchant's financial data, the merchant's customer profile information, or the merchant's supply chain information.

5. The processor-implemented method of claim 4, wherein the data about the merchant's business includes information about a competitor's business.

6. The processor-implemented method of claim 1, further comprising:
    sending, from the merchant to the financial institution, information to be aggregated; and
    analyzing, at the financial institution, the information received from the merchant and financial data of the merchant and combining this analysis with cognitive modeling to generate recommendations for the merchant's business.

7. A processor-implemented method for providing merchants business advice, the method comprising:
    providing a financial institution with a first dashboard, the first dashboard including information related to a plurality of businesses and a communication link to each of the businesses;
    generating a supply chain of a first business of the plurality of businesses using a plurality of data sources and a processor, wherein the supply chain includes a plurality of nodes and edges, each node representing an entity in the supply chain, each edge representing a transaction between two of the entities;

analyzing transactions among participants in the supply chain of the first business of the plurality of businesses and combining the transactions with pre-existing data about the first business to compute a business-related recommendation for the first business; and providing the business-related recommendation to the first business via the communication link between the first business and the financial institution.

8. The processor-implemented method of claim 7, further comprising:

analyzing transactions among participants in a supply chain of a second business of the plurality of businesses and combining the transactions with pre-existing data about the second business to compute a business-related recommendation for the second business; and providing the business-related recommendation to the second business via the communication link between the second business and the financial institution.

9. The processor-implemented method of claim 7, further comprising:

visualizing, at the first dashboard, competitors of the first business;

providing, at the first dashboard, comparisons of the first business and its competitors; and providing, to the first business, a business-related recommendation based on the comparison.

10. The processor-implemented method of claim 9, wherein information including financial data of the first business and its competitors and social network data of the first business and its competitors is used in the comparison of the first business and its competitors.

11. The processor-implemented method of claim 7, further comprising:

providing the first business with a second dashboard; and displaying the business-related recommendation provided from the financial institution.

12. The processor-implemented method of claim 7, wherein the communication link is wireless.

13. The processor-implemented method of claim 7, wherein the communication link is an internet communications link.

14. A processor-implemented method for providing merchants business advice, the method comprising:

generating a supply chain using a plurality of data sources and a processor, wherein the supply chain includes a plurality of nodes and edges, each node representing an entity in the supply chain, each edge having a profile and representing an interaction between two of the entities;

displaying a graphical representation of the supply chain in a graphical user interface;

using the profile at each entity in the supply chain and each interaction between two entities to determine a business-related recommendation for a merchant; and providing the business-related recommendation to the merchant via a communication link with the merchant.

15. The processor-implemented method of claim 14, further comprising:

using external data in combination with the supply chain to determine the business-related recommendation for the merchant.

16. The processor-implemented method of claim 14, wherein the external data comprises meteorological data, economic data, geopolitical data, commodity market data, business market data or demographic trends data.

17. The processor-implemented method of claim 14, further comprising:

using data provided from the merchant in combination with the supply chain to determine the business-related recommendation for the merchant.

18. The processor-implemented method of claim 14, wherein the data provided from the merchant includes social media data related to the merchant's business, the merchant's financial data, the merchant's customer profile information, or the merchant's supply chain information.

* * * * *